(12) United States Patent
Luo et al.

(10) Patent No.: US 11,265,865 B2
(45) Date of Patent: Mar. 1, 2022

(54) DYNAMIC PHYSICAL DOWNLINK CONTROL CHANNEL (PDCCH) RESOURCE SHARING BETWEEN PDCCH MONITORING AND PDCCH TRANSMISSION IN A MULTI-HOP NETWORK

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Luca Blessent, Whitehouse Station, NJ (US); Tao Luo, San Diego, CA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/829,742

(22) Filed: Mar. 25, 2020

(65) Prior Publication Data
US 2020/0351839 A1 Nov. 5, 2020

Related U.S. Application Data

(60) Provisional application No. 62/841,613, filed on May 1, 2019.

(51) Int. Cl.
*H04W 72/04* (2009.01)
*H04W 72/14* (2009.01)

(52) U.S. Cl.
CPC ......... *H04W 72/042* (2013.01); *H04W 72/14* (2013.01)

(58) Field of Classification Search
CPC .................... H04W 72/042; H04W 72/14
(Continued)

(56) References Cited

U.S. PATENT DOCUMENTS

2018/0367273 A1* 12/2018 Park .................. H04L 41/06

OTHER PUBLICATIONS

CATT: "Further Discussion on NR PDCCH Search Space," 3GPP Draft, 3GPP TSG RAN WG1 Meeting #91, R1-1720191, 3rd Generation Partnership Project (3GPP), Mobile Competence Centre; 650, Route Des Lucioles; F-06921 Sophia-Antipolis Cedex; France vol. RAN WG1, No. Reno, USA; Nov. 27, 2017-Dec. 1, 2017, Nov. 18, 2017 (Nov. 18, 2017), XP051369827, 5 pages, Retrieved from the Internet: URL: http://www.3gpp.org/ftp/tsg%5Fran/WG1%5FRL1/TSGR1%5F91/Docs/ [retrieved on Nov. 18, 2017].

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a node in a multi-hop network may receive a configuration that indicates a first set of physical downlink control channel (PDCCH) resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node. The node in a multi-hop network may configure a resource of the third set of PDCCH resources for one of PDCCH monitoring or neither PDCCH monitoring nor PDCCH transmission based at least in part on an initial state associated with the resource. Numerous other aspects are provided.

30 Claims, 11 Drawing Sheets

(58) Field of Classification Search
USPC .......................................................... 370/329
See application file for complete search history.

(56) References Cited

OTHER PUBLICATIONS

Huawei, et al., "Resource Multiplexing Between Backhaul and Access in IAB," 3GPP Draft, 3GPP TSG RAN WG1 Meeting #96, R1-1901533, vol. RAN WG1. No. Athens. Greece; Feb. 25, 2019-Mar. 1, 2019, Feb. 16, 2019 (Feb. 16, 2019), XP051599230, 8 pages, Retrieved from the Internet: URL:http://www.3gpp.org/ftp/tsg%5Fran/WG1%5FRL1/TSGR1%5F96/Docs/R1%2D1901533%2Ezip [retrieved on Feb. 16, 2019],Sections 1-4.
International Search Report and Written Opinion—PCT/US2020/024926—ISA/EPO—dated Jun. 23, 2020.

* cited by examiner

DYNAMIC PHYSICAL DOWNLINK CONTROL CHANNEL (PDCCH) RESOURCE SHARING BETWEEN PDCCH MONITORING AND PDCCH TRANSMISSION IN A MULTI-HOP NETWORK

CROSS-REFERENCE TO RELATED APPLICATION

This patent application claims priority to U.S. Provisional Patent Application No. 62/841,613, filed on May 1, 2019, entitled "DYNAMIC PHYSICAL DOWNLINK CONTROL CHANNEL (PDCCH) RESOURCE SHARING BETWEEN PDCCH MONITORING AND PDCCH TRANSMISSION IN A MULTI-HOP NETWORK," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for dynamic physical downlink control channel (PDCCH) resource sharing between PDCCH monitoring and PDCCH transmission in a multi-hop network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node in a multi-hop network, may include receiving a configuration that indicates a first set of physical downlink control channel (PDCCH) resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node; and configuring a resource of the third set of PDCCH resources for one of PDCCH monitoring or neither PDCCH monitoring nor PDCCH transmission based at least in part on an initial state associated with the resource.

In some aspects, a method of wireless communication, performed by a triggering node in a multi-hop network, may include transmitting a configuration that indicates a first set of PDCCH resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node; and transmitting an activation message to activate one or more resources of the third set of PDCCH resources for PDCCH monitoring.

In some aspects, a node in a multi-hop network for wireless communication may include memory and one or more processors operatively coupled to the memory. The memory and the one or more processors may be configured to receive a configuration that indicates a first set of PDCCH resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node; and configure a resource of the third set of PDCCH resources for one of PDCCH monitoring or neither PDCCH monitoring nor PDCCH transmission based at least in part on an initial state associated with the resource.

In some aspects, a triggering node in a multi-hop network for wireless communication may include memory and one or more processors operatively coupled to the memory. The memory and the one or more processors may be configured to transmit a configuration that indicates a first set of PDCCH resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node; and transmit an activation message to activate one or more resources of the third set of PDCCH resources for PDCCH monitoring.

In some aspects, a non-transitory computer-readable medium may store one or more instructions for wireless communication. The one or more instructions, when executed by one or more processors of a node in a multi-hop network, may cause the one or more processors to: receive a configuration that indicates a first set of PDCCH resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node; and configure a resource of the third set of PDCCH resources for one of PDCCH monitoring or neither PDCCH monitoring nor PDCCH transmission based at least in part on an initial state associated with the resource.

In some aspects, a non-transitory computer-readable medium may store one or more instructions for wireless communication. The one or more instructions, when executed by one or more processors of a triggering node in a multi-hop network, may cause the one or more processors to: transmit a configuration that indicates a first set of PDCCH resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node; and transmit an activation message to activate one or more resources of the third set of PDCCH resources for PDCCH monitoring.

In some aspects, an apparatus for wireless communication may include means for receiving a configuration that indicates a first set of PDCCH resources dedicated to PDCCH monitoring by the apparatus, a second set of PDCCH resources dedicated to PDCCH transmission by the apparatus, and a third set of PDCCH resources permitted to be configured for either PDCCH monitoring by the apparatus or PDCCH transmission by the apparatus; and means for configuring a resource of the third set of PDCCH resources for one of PDCCH monitoring or neither PDCCH monitoring nor PDCCH transmission based at least in part on an initial state associated with the resource.

In some aspects, an apparatus for wireless communication may include means for transmitting a configuration that indicates a first set of PDCCH resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node; and means for transmitting an activation message to activate one or more resources of the third set of PDCCH resources for PDCCH monitoring.

In some aspects, a resource of the third set of PDCCH resources may be dynamically configured in three different states. In a first state (e.g., a deactivated state), the resource is not used for PDCCH communications. For example, in the first state, the resource is not used for PDCCH monitoring or PDCCH transmission (e.g., is configured for neither PDCCH monitoring nor PDCCH transmission). In this first state, the PDCCH resource may be used for communications on a channel other than the PDCCH, such as a PDSCH. In a second state (e.g., a default activated state), the resource is used for PDCCH monitoring (and not PDCCH transmission). In a third state (e.g., an overridden activated state), the resource is used for PDCCH transmission (and not PDCCH monitoring). The UE may transition between states as described herein.

Aspects generally include a method, apparatus, system, computer program product, non-transitory computer-readable medium, user equipment, base station, wireless communication device, node, triggering node, integrated access and backhaul (IAB) node, IAB donor, central unit, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
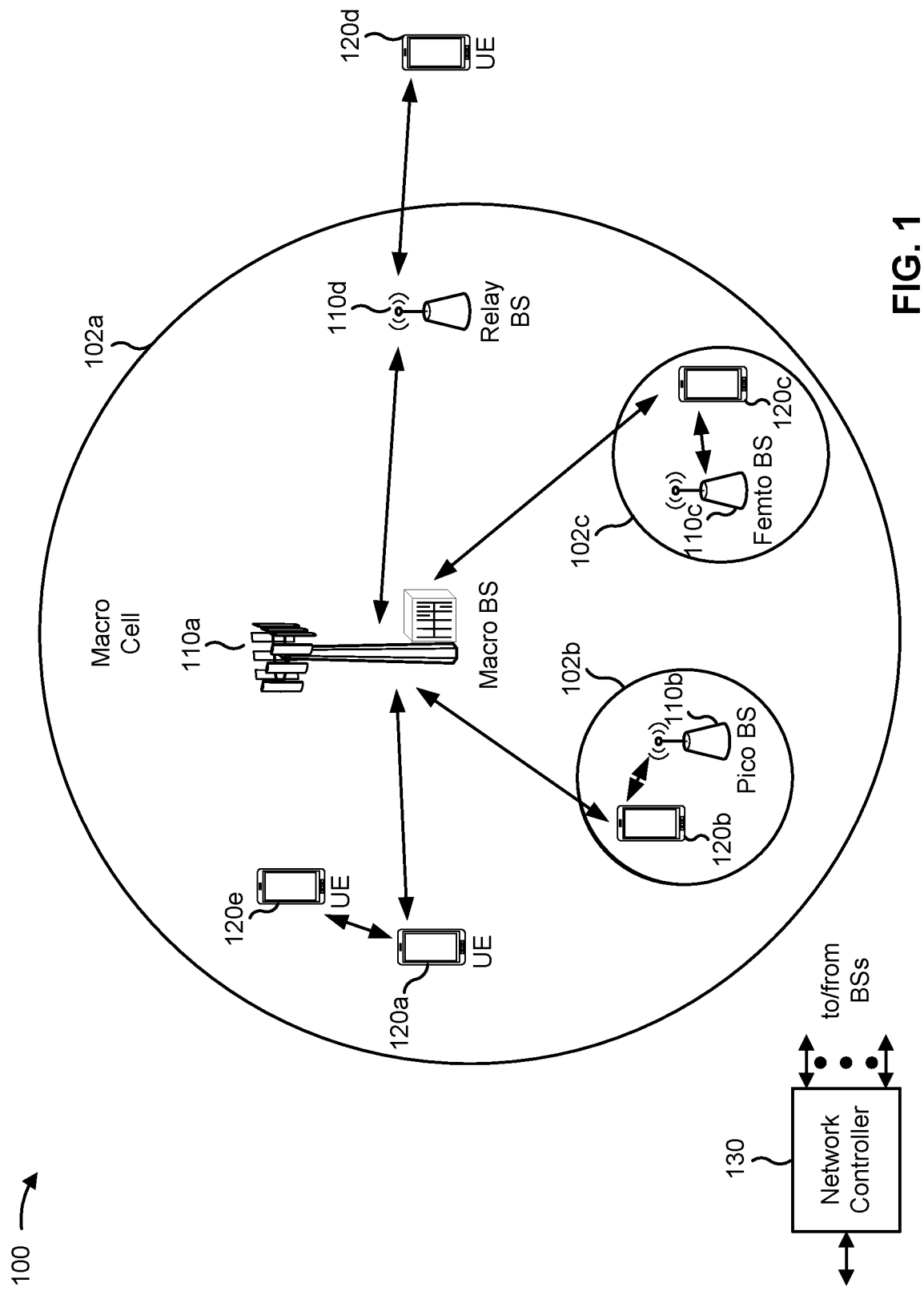
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
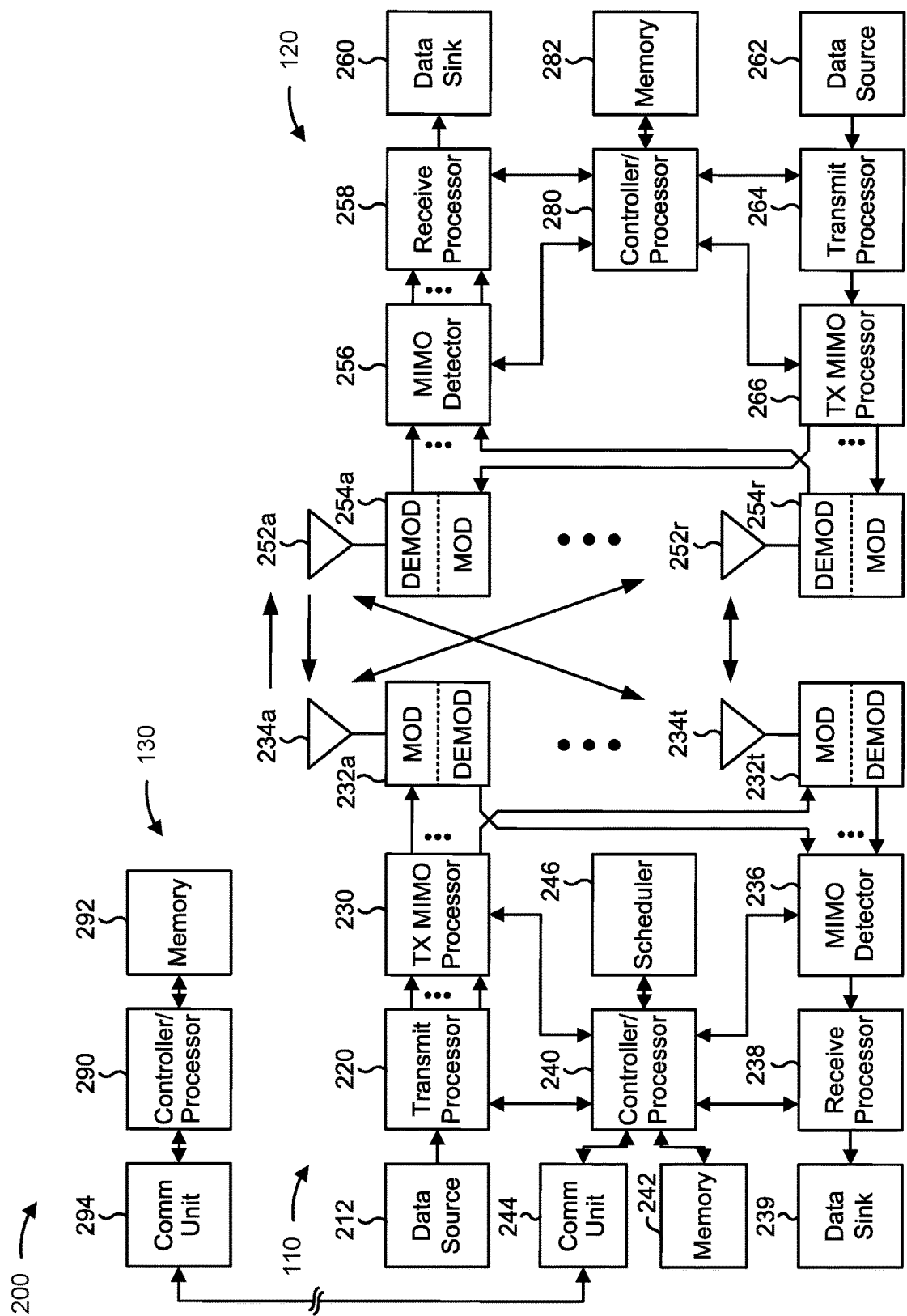
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic PDCCH resource sharing between PDCCH monitoring and PDCCH transmission, as described in more detail elsewhere herein. Additionally, or alternatively, a node in an IAB network (e.g., an IAB node, an IAB donor, and/or the like) and/or a node in another type of multi-hop network may perform one or more techniques associated with dynamic PDCCH resource sharing between PDCCH monitoring and PDCCH transmission. As described in more detail elsewhere herein, such a node may include a mobile termination or a mobile terminal (MT) component and a distributed unit (DU) component. Additionally, or alternatively, a node (e.g., an IAB donor) may include a central unit (CU) component and a DU. The MT component may perform one or more functions of a UE 120 described herein (e.g., in connection with FIGS. 1-3) and/or may include one or more components of a UE 120 described herein (e.g., in connection with FIG. 2). The DU component may perform one or more functions of a base station 110 described herein (e.g., in connection with FIGS. 1-3), such as scheduling, and/or may include one or more components of a base station 110 described herein (e.g., in connection with FIG. 2). The CU component may perform one or more functions of a base station 110 described herein (e.g., in connection with FIGS. 1-3), such as configuration for other nodes, and/or may include one or more components of a base station 110 described herein (e.g., in connection with FIG. 2).

Figure 10:
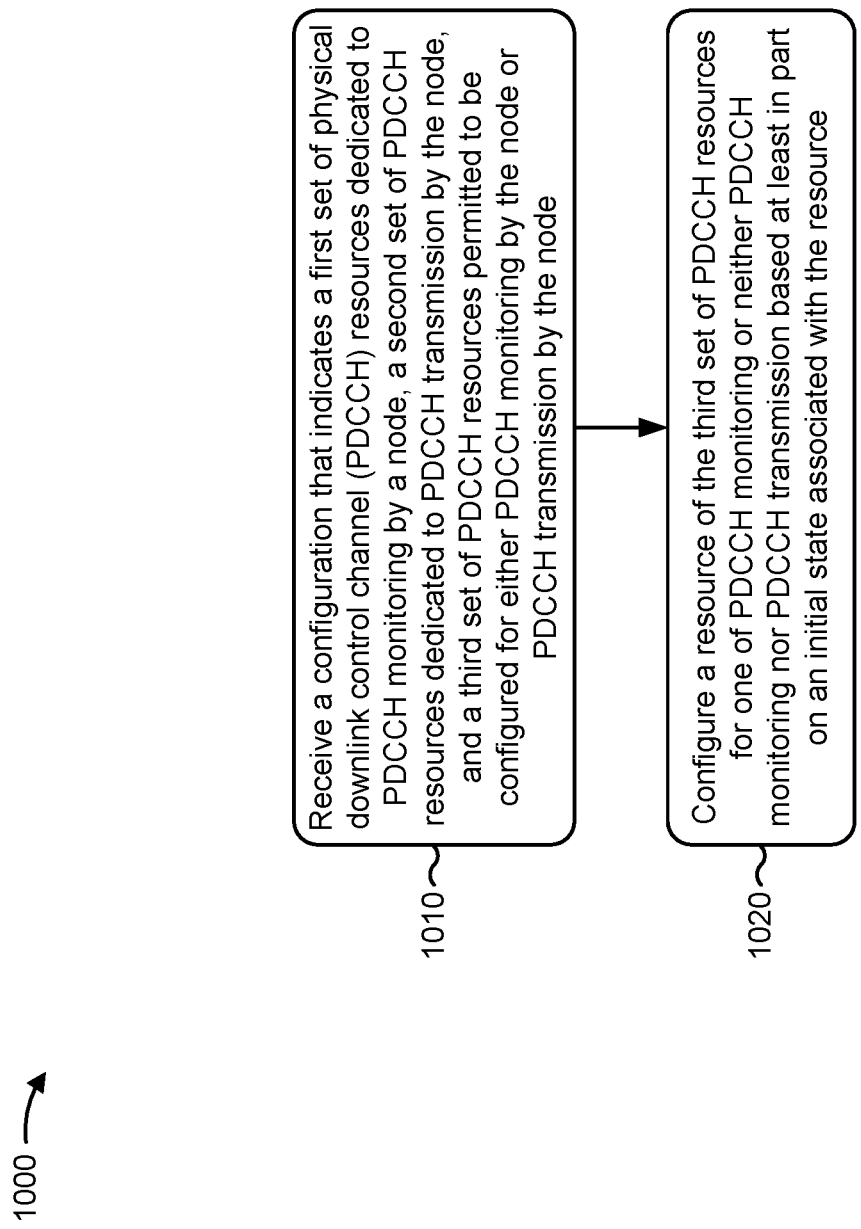
FIGS. 10 and 11 are diagrams illustrating example processes relating to dynamic PDCCH resource sharing between PDCCH monitoring and PDCCH transmission, in accordance with various aspects of the present disclosure.
Figure 11:
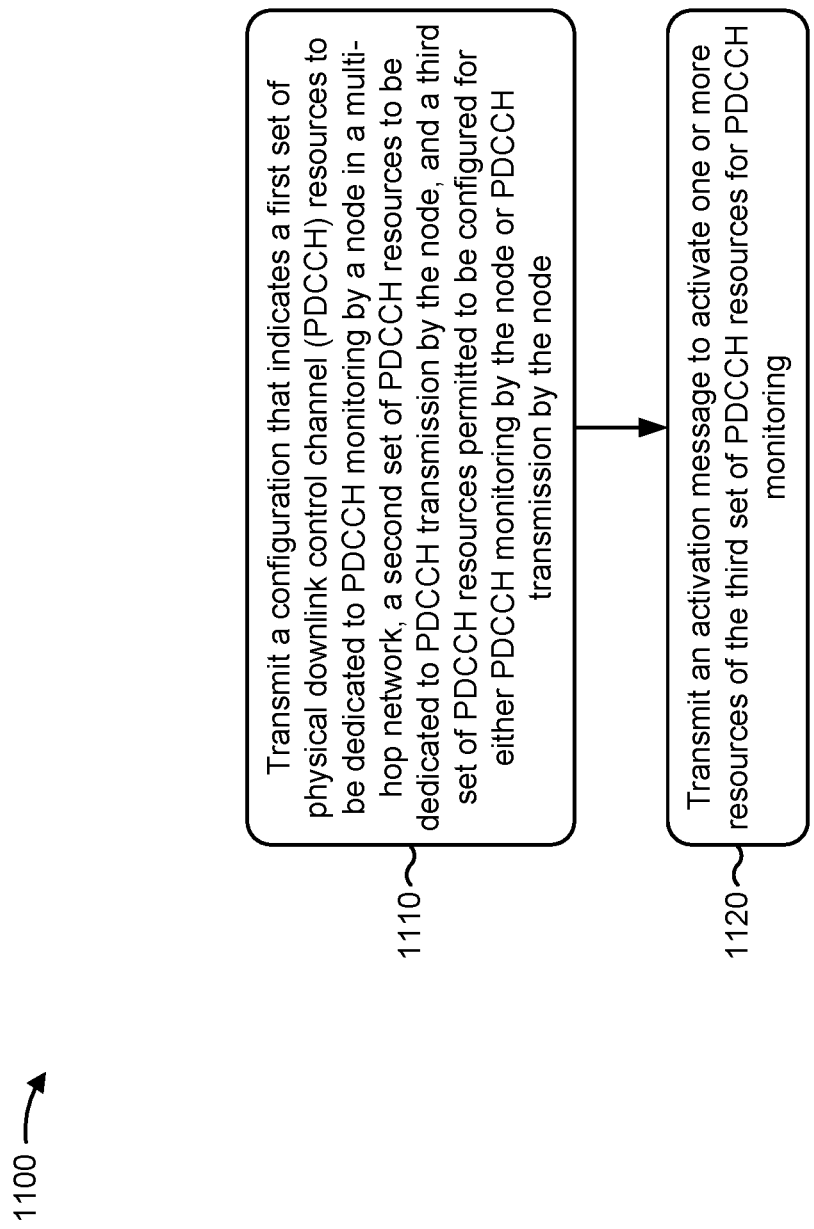

In some aspects, controller/processor 240 of base station 110 and/or a node, controller/processor 280 of UE 120 and/or a node, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, a node in a multi-hop network (e.g., as described elsewhere herein) may include means for receiving a configuration that indicates a first set of physical downlink control channel (PDCCH) resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node; means for configuring a resource of the third set of PDCCH resources for one of PDCCH monitoring or neither PDCCH monitoring nor PDCCH transmission based at least in part on an initial state associated with the resource; and/or the like. In some aspects, such means may include one or more components of UE 120 and/or base station 110 (which may be included in the node) described in connection with FIG. 2.

In some aspects, a triggering node in a multi-hop network (e.g., as described elsewhere herein) may include means for transmitting a configuration that indicates a first set of PDCCH resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node; means for transmitting an activation message to activate one or more resources of the third set of PDCCH resources for PDCCH monitoring; and/or the like. In some aspects, such means may include one or more components of UE 120 and/or base station 110 (which may be included in the triggering node) described in connection with FIG. 2.

As indicated above, FIG. 2 is provided as an example. Other examples may differ from what is described with regard to FIG. 2.

Figure 3:
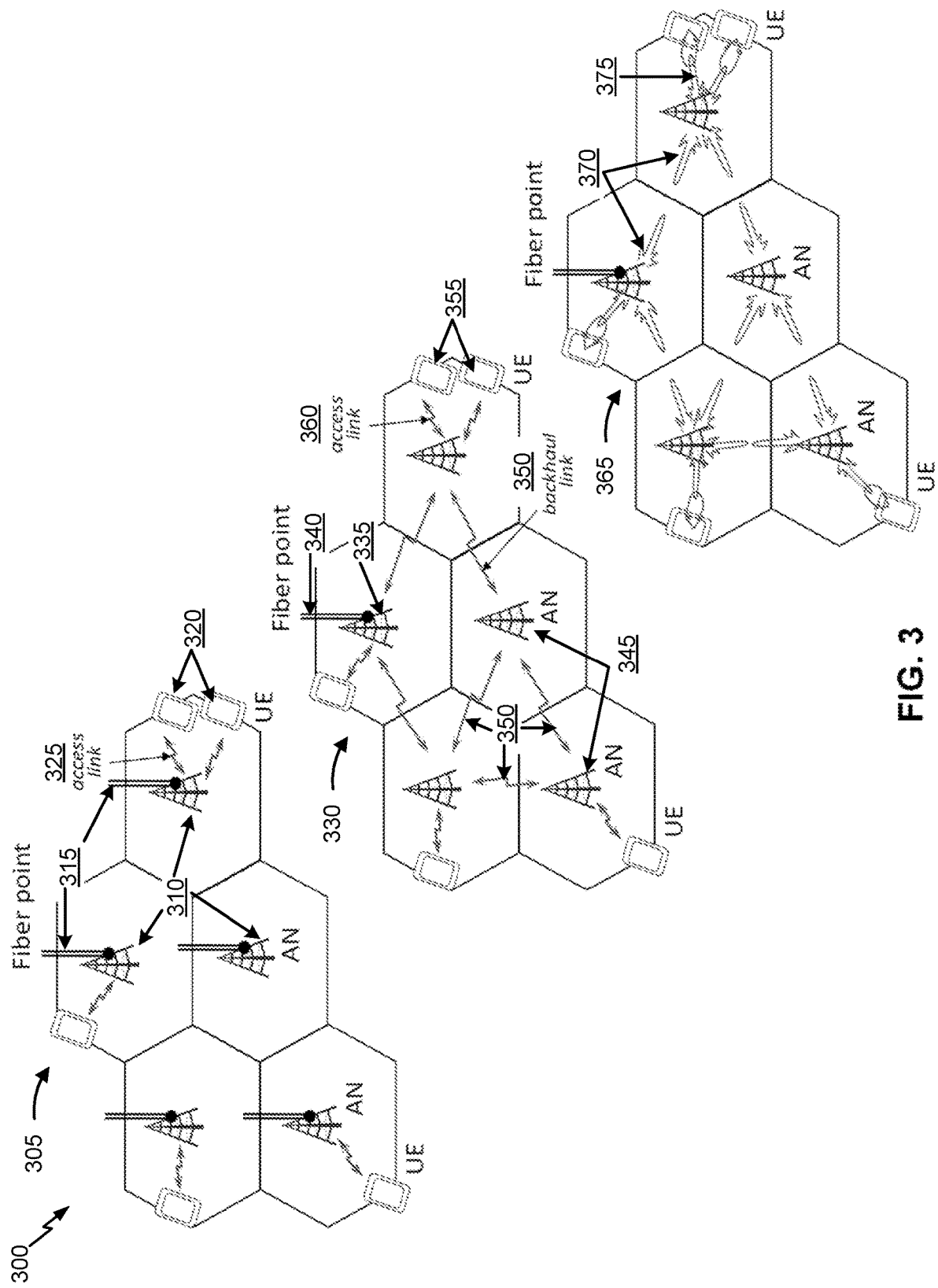
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
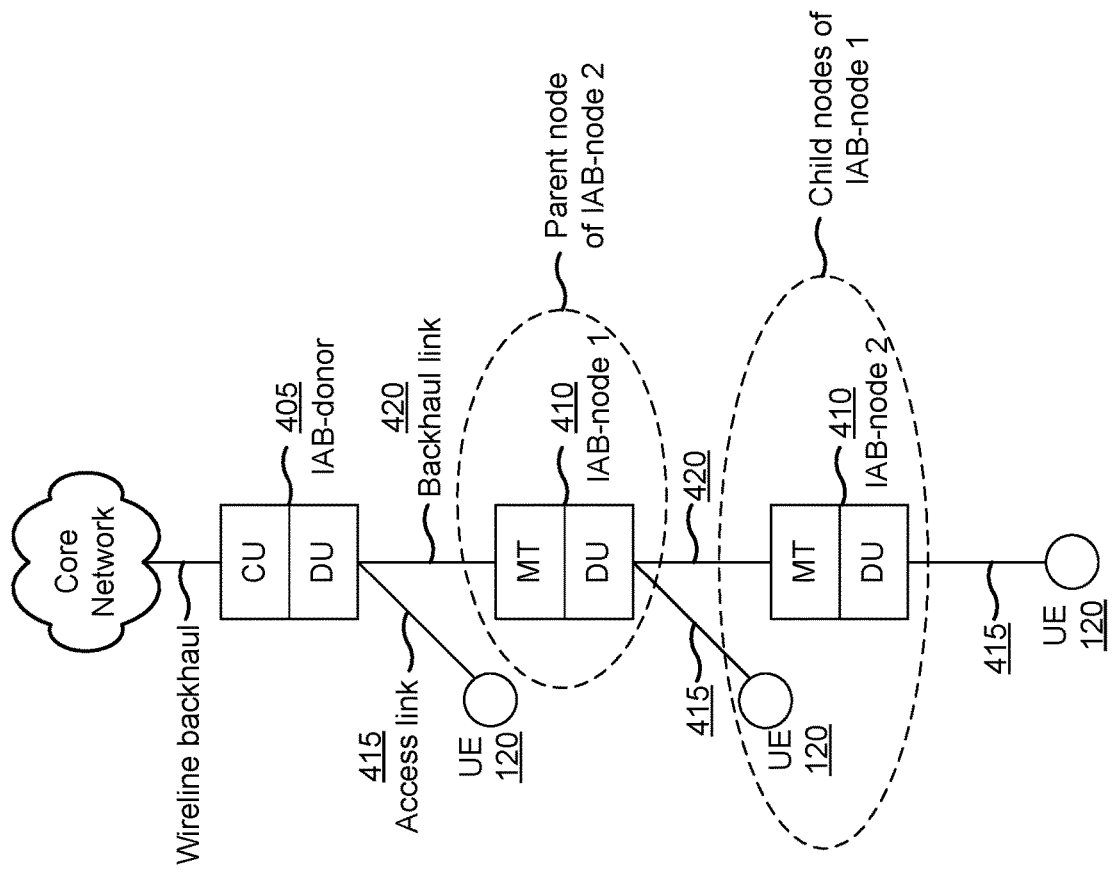
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may be include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1 and IAB-node 2) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, a node or a wireless node may refer to an IAB donor 405 or an IAB node 410.

In an IAB network, network resources for wireless communications (e.g., time resources, frequency resources, spatial resources, and/or the like) may be shared between access links 415 and backhaul links 420. When the IAB network uses time division multiplexing (TDM), nodes of the IAB network are subject to a half duplex constraint, meaning that a particular node cannot transmit and receive information at the same time (e.g., cannot concurrently communicate via an access link 415 of the node and a backhaul link 420 of the node). This constraint may lead to high latency for communications.

In some cases, a CU of an IAB donor 405 may configure resource patterns for IAB nodes 410 in the IAB network. For example, a time resource may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node (e.g., by a DU of the parent node). For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node). For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

When resources of an IAB network are configured as indicated above, an IAB node 410 may be required to wait for transmission of a communication until an available downlink time resource (e.g., a hard downlink resource, an available soft downlink resource, and/or the like) is configured and/or scheduled for the IAB node 410 (e.g., according to a resource pattern configured for the IAB node 410). This may increase latency in the IAB network, especially when such waiting occurs at multiple hops (e.g., multiple IAB nodes 410). However, some scenarios may require lower latency, such as an ultra-reliable low latency communication (URLLC).

As indicated above, FIG. 4 is provided as an example. Other examples may differ from what is described with regard to FIG. 4.

Figure 5:
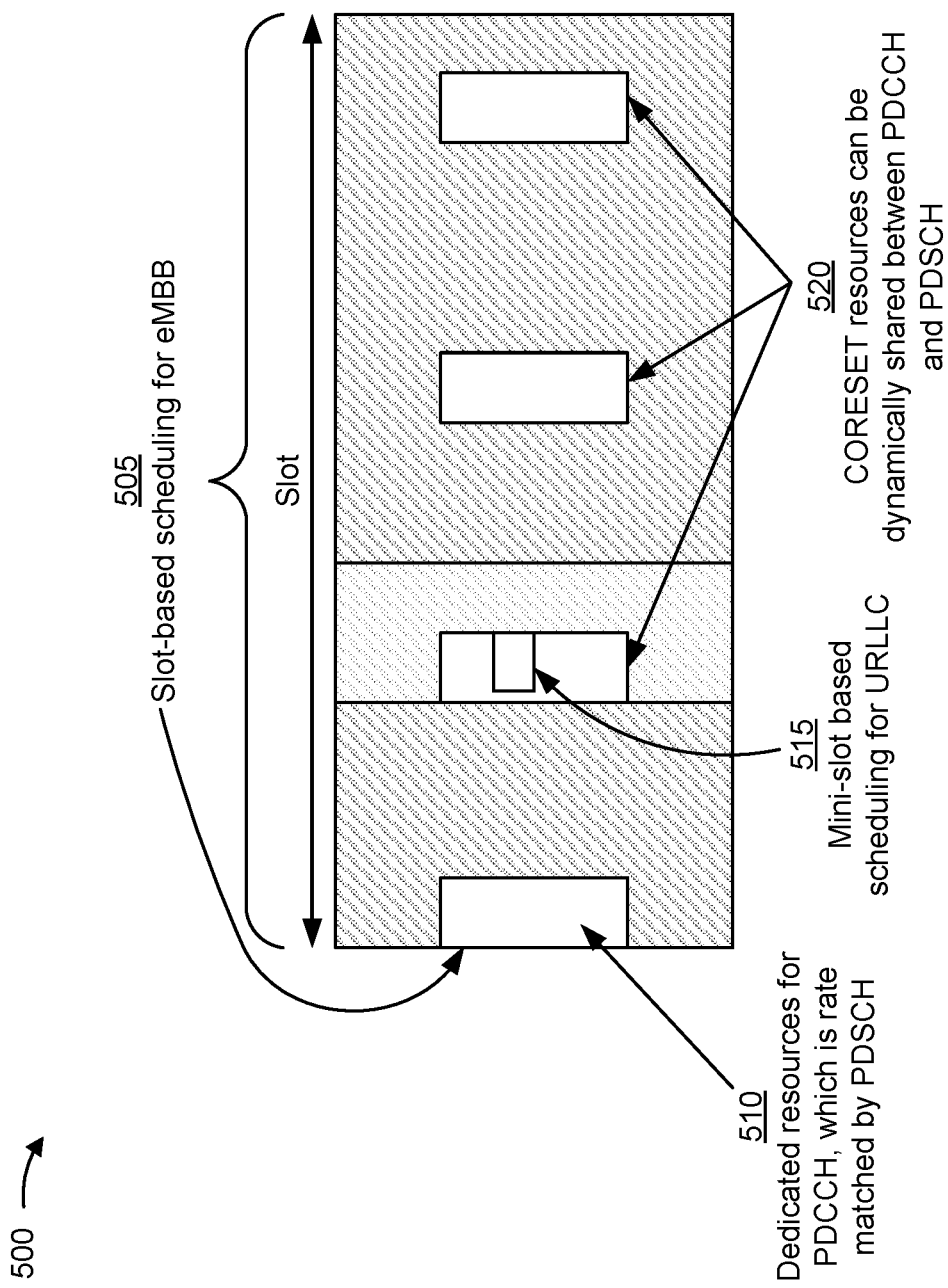
FIG. 5 is a diagram illustrating an example of a resource configuration that supports slot-based scheduling and mini-slot-based scheduling, in accordance with various aspects of the present disclosure.

FIG. 5 is a diagram illustrating an example 500 of a resource configuration that supports slot-based scheduling and mini-slot-based scheduling, in accordance with various aspects of the present disclosure.

As shown by reference number 505, slot-based scheduling may be used for a first service type, such as evolved mobile broadband (eMBB), which may support high data rates across a wide coverage area, and may be associated with a higher latency requirement and/or a lower reliability requirement than a second service type, such as URLLC.

As shown by reference number 510, a set of resources in a slot may be dedicated to a PDCCH that carries downlink control information (DCI) for slot-based scheduling. Because this type of scheduling is per slot, the PDCCH resources for slot-based scheduling may occur once per slot (e.g., a single PDCCH occasion per slot), such as at the beginning of a slot (e.g., in the first symbol, the first two symbols, or the first three symbols). Data communications on a physical downlink shared channel (PDSCH) may be rate matched around the dedicated PDCCH resources.

As shown by reference number 515, mini-slot-based scheduling may be used for a second service type, such as URLLC, which may be used for mission critical communications and may have strict requirements for latency and reliability, such as a lower latency requirement and/or a higher reliability requirement than a first service type, such as eMBB. A mini-slot may have a duration that is less than a slot. For example, a slot may occupy 12 symbols or 14 symbols, and a mini-slot may have flexible starting locations within a slot and a flexible duration, such as 2 symbols, 4 symbols, or 7 symbols.

As shown by reference number 520, a slot may include multiple control resource sets (CORESETs) that support mini-slot-based scheduling (e.g., multiple PDCCH occasions per slot), such as for URLLC. A CORESET may include resources that can be dynamically shared between PDCCH communications and PDSCH communications using rate matching. For example, if a URLLC communication is not scheduled in a slot, then an eMBB PDCCH (shown by reference number 510) can deactivate the CORESETs for mini-slot-based scheduling to permit PDSCH communications to be transmitted and/or received in the CORESETs. With this type of resource configuration, a UE 120 may monitor multiple PDCCH occasions for DCI for mini-slot-based scheduling. A URLLC communications scheduled using mini-slot-based scheduling may puncture a scheduled eMBB communication, thereby giving higher priority to URLLC traffic to assist with satisfying stricter requirements than eMBB traffic.

As indicated above, FIG. 5 is provided as an example. Other examples may differ from what is described with regard to FIG. 5.

Figure 6:
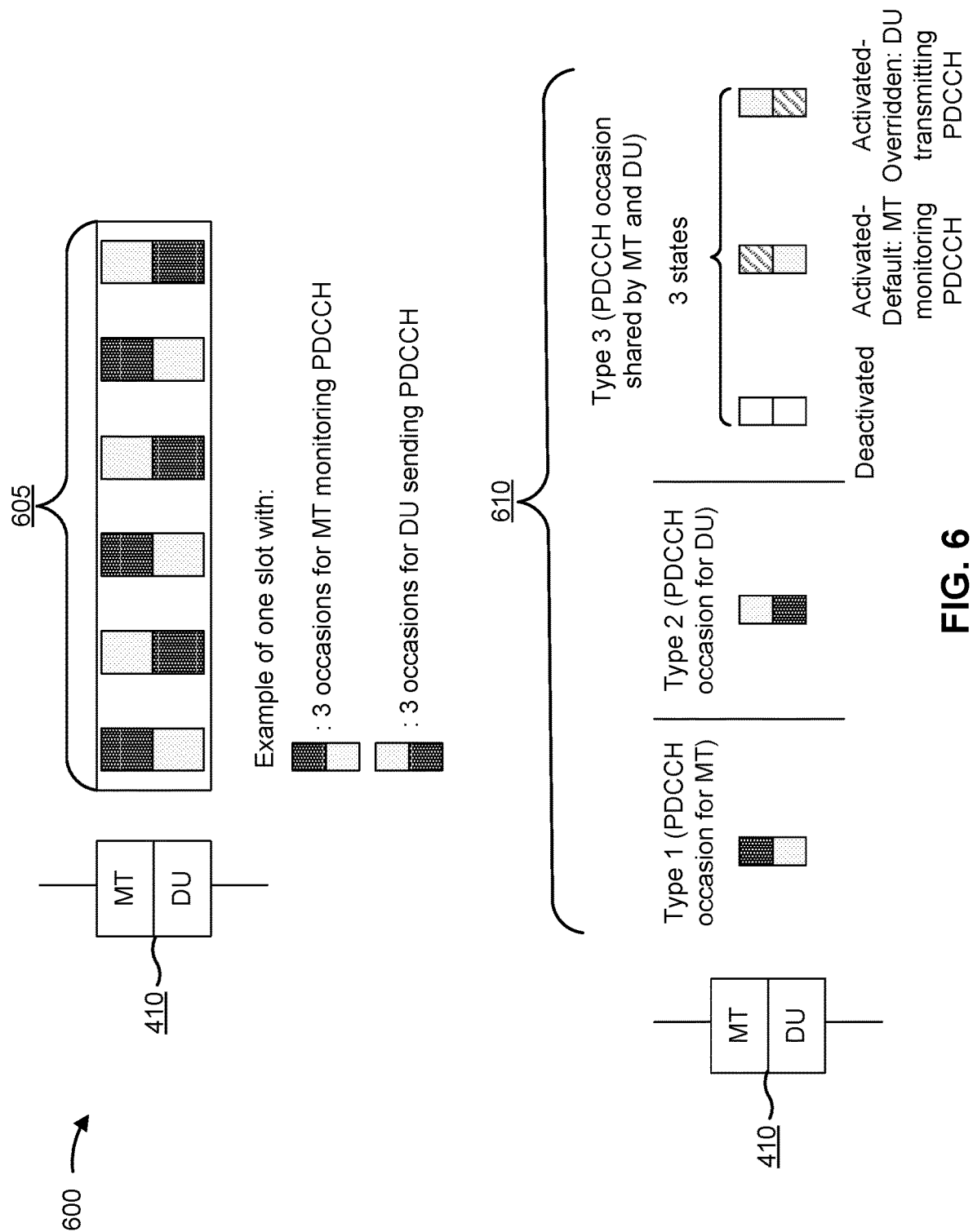
FIGS. 6-9 are diagrams illustrating examples of dynamic physical downlink control channel (PDCCH) resource sharing between PDCCH monitoring and PDCCH transmission, in accordance with various aspects of the present disclosure.

FIG. 6 is a diagram illustrating an example 600 of dynamic PDCCH resource sharing between PDCCH monitoring and PDCCH transmission, in accordance with various aspects of the present disclosure.

As shown by reference number 605, in an IAB network that includes nodes with MT functions and DU functions, in order to support mini-slot-based scheduling for low latency traffic (e.g., URLLC traffic), multiple CORESETs are needed per slot, as described above in connection with FIG. 5. Furthermore, if dedicated uplink and downlink resources are configured for the node, then the node needs to be configured with a PDCCH monitoring occasion (e.g., for an MT to monitor for PDCCH communications from a parent node) and a PDCCH transmission occasion (e.g., for a DU to transmit PDCCH communications to a child node) for each of the CORESETs. This may lead to significant overhead. For example, in a slot with 14 symbols and 3 CORESETs for mini-slot-based scheduling, at least 6 of the 14 symbols would be used for PDCCH occasions.

Some techniques and apparatuses described herein reduce the overhead used for PDCCH occasions (e.g., CORESETs) for mini-slot-based scheduling in an IAB network (or another type of multi-hop network) by permitting dynamic sharing of PDCCH resources (e.g., CORESETs, PDCCH occasions, and/or the like) between PDCCH monitoring (e.g., by an MT of a node) and PDCCH transmission (e.g., by a DU of a node).

For example, as shown by reference number 610, a node may be configured with three different types of PDCCH resources. A first type of PDCCH resource, shown as Type 1, may be dedicated to PDCCH monitoring by the node (e.g., a PDCCH occasion for PDCCH monitoring by an MT of the node). A second type of PDCCH resource, shown as Type 2, may be dedicated to PDCCH transmission by the node (e.g., a PDCCH occasion for PDCCH transmission by a DU of the node). A third type of PDCCH resource, shown as Type 3, may be dynamically configured in three different states. In a first state, shown as deactivated, the third type of PDCCH resource is not used for PDCCH communications. For example, in the first state, the third type of PDCCH resource is not used for PDCCH monitoring or PDCCH transmission (e.g., is configured for neither PDCCH monitoring nor PDCCH transmission). In this first state, the PDCCH resource may be used for communications on a channel other than the PDCCH, such as a PDSCH, thereby improving resource utilization. In a second state, shown as a default activated state (activated-default), the third type of PDCCH resource is used for PDCCH monitoring (and not PDCCH transmission). For example, in the second state, an MT of the node may monitor for a PDCCH communication from a parent node of the node. In a third state, shown as an overridden activated state (activated-overridden), the third type of PDCCH resource is used for PDCCH transmission (and not PDCCH monitoring). For example, in the third state, a DU of the node may transmit a PDCCH communication to one or more child nodes of the node.

In some aspects, the node may be configured with a first resource set of the first type of PDCCH resources, a second resource set of the second type of PDCCH resources, and a third resource set of the third type of PDCCH resources, as described in more detail below. By configuring a resource set of the third type of PDCCH resources that can be flexibly reconfigured, overhead for PDCCH occasions (e.g., CORESETs) for mini-slot-based scheduling in an IAB network (or another type of multi-hop network) may be reduced by permitting dynamic sharing of PDCCH resources between PDCCH monitoring and PDCCH transmission. Furthermore, latency of mini-slot-based communications (e.g., URLLC communications) may be reduced with such flexible configurations.

As indicated above, FIG. 6 is provided as an example. Other examples may differ from what is described with regard to FIG. 6.

Figure 7:
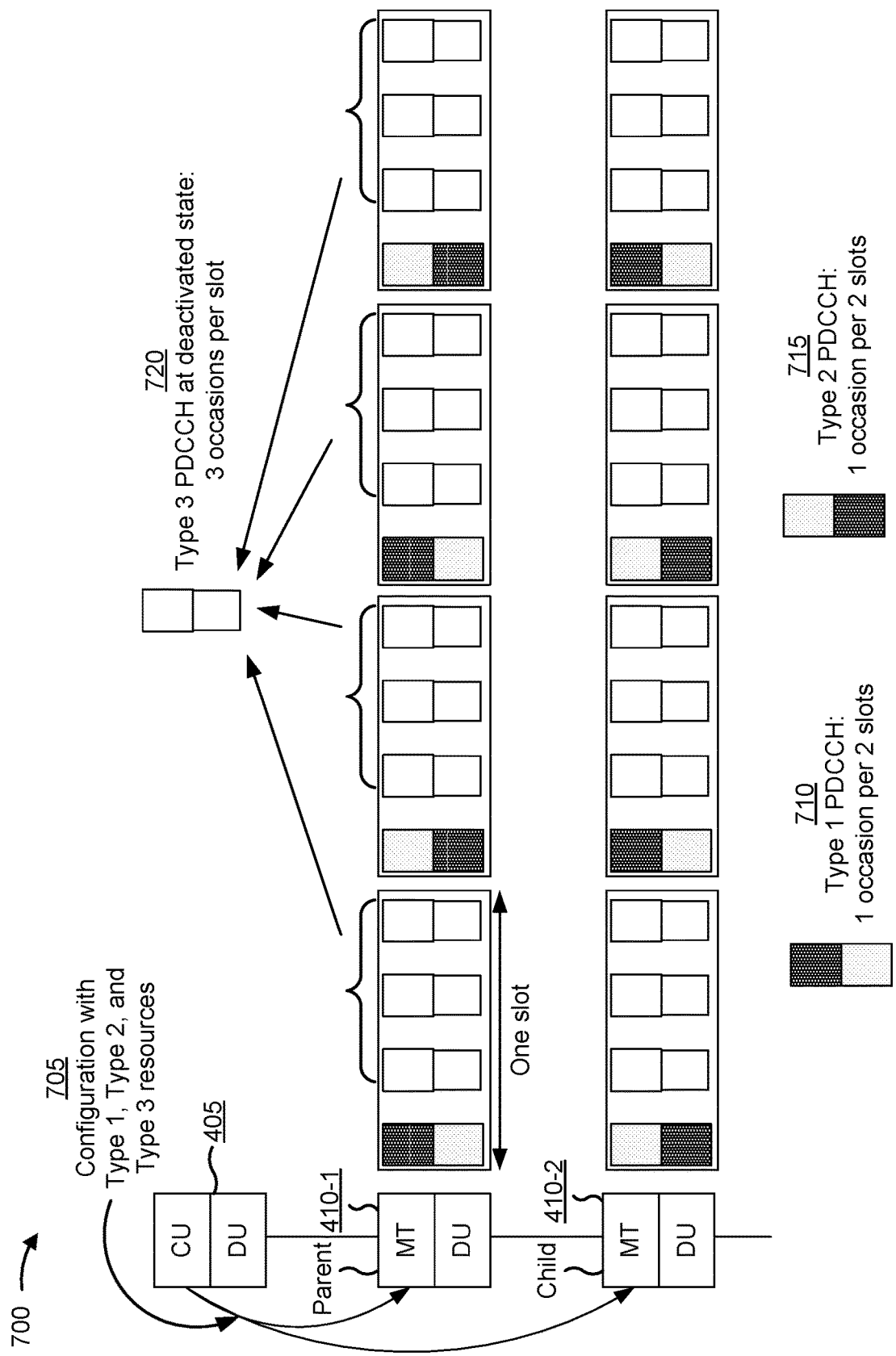

FIG. 7 is a diagram illustrating another example 700 of dynamic PDCCH resource sharing between PDCCH monitoring and PDCCH transmission, in accordance with various aspects of the present disclosure.

As shown by reference number 705, a CU of an IAB donor 405 may transmit a configuration for PDCCH resources (e.g., a PDCCH resource configuration), and one or more IAB nodes 410 may receive the configuration (such as a first IAB node 410-1 that is parent node of a second IAB node 410-2 that is a child node of the first IAB node 410-1, as shown in FIG. 7). As shown, in some aspects, the IAB donor 405 may transmit the configuration to one or more child nodes of the IAB donor 405. A first child node may use the configuration to configure a PDCCH resource configuration for an MT and/or a DU of the first child node, and the first child node may relay the configuration to one or more second child nodes of the first child node. The configuration may be used to configure the IAB nodes 410 (e.g., an MT and/or a DU of the IAB node 410). In some aspects, a node that transmits a PDCCH resource configuration and/or that detects a triggering event for activating a PDCCH resource may be referred to as a triggering node.

As shown by reference number 710, the configuration for a node may indicate a first set of PDCCH resources, shown as Type 1 PDCCH resources, dedicated to PDCCH monitoring by the node (e.g., by an MT of the node). When a resource is dedicated to PDCCH monitoring by a node, an MT of the node performs PDCCH monitoring in that resource, and a DU of the node refrains from and/or is prohibited from performing PDCCH transmission in that resource. In some aspects, a Type 1 PDCCH occasion may be used for slot-based scheduling (e.g., for eMBB traffic). In some aspects, a slot may include at most a single Type 1 PDCCH occasion. In example 700, a node is configured with one Type 1 PDCCH occasion every two slots.

As shown by reference number 715, the configuration for a node may indicate a second set of PDCCH resources, shown as Type 2 PDCCH resources, dedicated to PDCCH transmission by the node (e.g., by a DU of the node). When a resource is dedicated to PDCCH transmission by a node, a DU of the node performs PDCCH transmission in that resource (e.g., if there is a PDCCH communication to be transmitted), and an MT of the node refrains from and/or is prohibited from performing PDCCH monitoring in that resource. In some aspects, a Type 2 PDCCH occasion may be used for slot-based scheduling (e.g., for eMBB traffic). In some aspects, a slot may include at most a single Type 2 PDCCH occasion. In example 700, a node is configured with one Type 2 PDCCH occasion every two slots, and consecutive slots alternate between having a Type 1 PDCCH occasion and a Type 2 PDCCH occasion. In some aspects, Type 1 PDCCH resources and Type 2 PDCCH resources are non-overlapping. A Type 1 PDCCH resource may be unavailable for a DU, and a Type 2 PDCCH resource may be a hard resource (e.g., a hard downlink resource) for a DU, as described above in connection with FIG. 4.

As shown by reference number 720, the configuration for a node may indicate a third set of PDCCH resources, shown as Type 3 PDCCH resources, that are permitted to be flexibly configured for either PDCCH monitoring by the node (e.g., by an MT of the node) or PDCCH transmission by the node (e.g., by a DU of the node). When a resource is configured as a Type 3 PDCCH resource, the node may perform either PDCCH monitoring in the resource, PDCCH transmission in the resource (e.g., if there is a PDCCH communication to be transmitted in the resource), or neither PDCCH monitoring nor PDCCH transmission in the resource (e.g., the resource may be used for a communication in a channel other than the PDCCH). In some aspects, a Type 3 PDCCH occasion may be used for mini-slot-based scheduling (e.g., for URLLC traffic). As shown, Type 3 PDCCH resources may be time-aligned between a parent node and a child node to permit a child node to receive a PDCCH transmission from a parent node. A Type 3 PDCCH resource may be a soft resource for a DU, as described above in connection with FIG. 4.

In some aspects, a slot may include multiple Type 3 PDCCH occasions. In this case, the third set of PDCCH resources occurs more frequently than the first set of PDCCH resources and occurs more frequently than the second set of PDCCH resources. In example 700, a node is configured with a single Type 1 or Type 2 PDCCH occasion in every slot, and is configured with three Type 3 PDCCH occasions in every slot. The number of Type 3 PDCCH occasions per slot shown in FIG. 7 is provided as an example, and other examples are contemplated.

When a node receives a configuration for a Type 3 PDCCH resource, the node may configure the Type 3 PDCCH resource (e.g., of a third set of PDCCH resources indicated in the configuration) for one of (1) PDCCH monitoring or (2) neither PDCCH monitoring nor PDCCH transmission. The node may configure the Type 3 PDCCH resource based at least in part on an initial state associated with the resource. For example, when the initial state of a Type 3 PDCCH resource is a deactivated state, then the node may configure the Type 3 PDCCH resource to be available for non-PDCCH communications (e.g., may configure the Type 3 PDCCH resource for neither PDCCH monitoring nor PDCCH transmission), such as PDSCH communications and/or the like. Alternatively, when the initial state of a Type 3 PDCCH resource is a default activated state, then the node may configure the Type 3 PDCCH resource for PDCCH monitoring (and not PDCCH transmission).

In some aspects, the initial state may be prespecified (e.g., according to a wireless communication standard). In some aspects, the initial state may be indicated in the PDCCH resource configuration transmitted by the CU of the IAB donor 405. In some aspects, the node may configure all Type 3 PDCCH resources with the same initial state (e.g., based at least in part on prespecified information and/or a PDCCH resource configuration). In some aspects, the node may configure different subsets of Type 3 PDCCH resources (e.g., different subsets of the third set of PDCCH resources) with different initial states (e.g., based at least in part on prespecified information and/or a PDCCH resource configuration). For example, the PDCCH resource configuration may indicate a first subset of Type 3 PDCCH resources that are to be configured in the deactivated state and/or a second subset of Type 3 PDCCH resources that are to be configured in a default activated state.

In some aspects, a node may reconfigure a Type 3 PDCCH resource from one state (e.g., of a first, second, or third state, as described elsewhere herein) to another state (e.g., of a first, second, or third state, as described elsewhere herein). Additional details regarding state transitions are described below in connection with FIG. 8. In this way, a PDCCH occasion may be flexibly reconfigured to improve resource utilization and satisfy communication requirements (e.g., for URLLC communications).

As indicated above, FIG. 7 is provided as an example. Other examples may differ from what is described with regard to FIG. 7.

Figure 8:
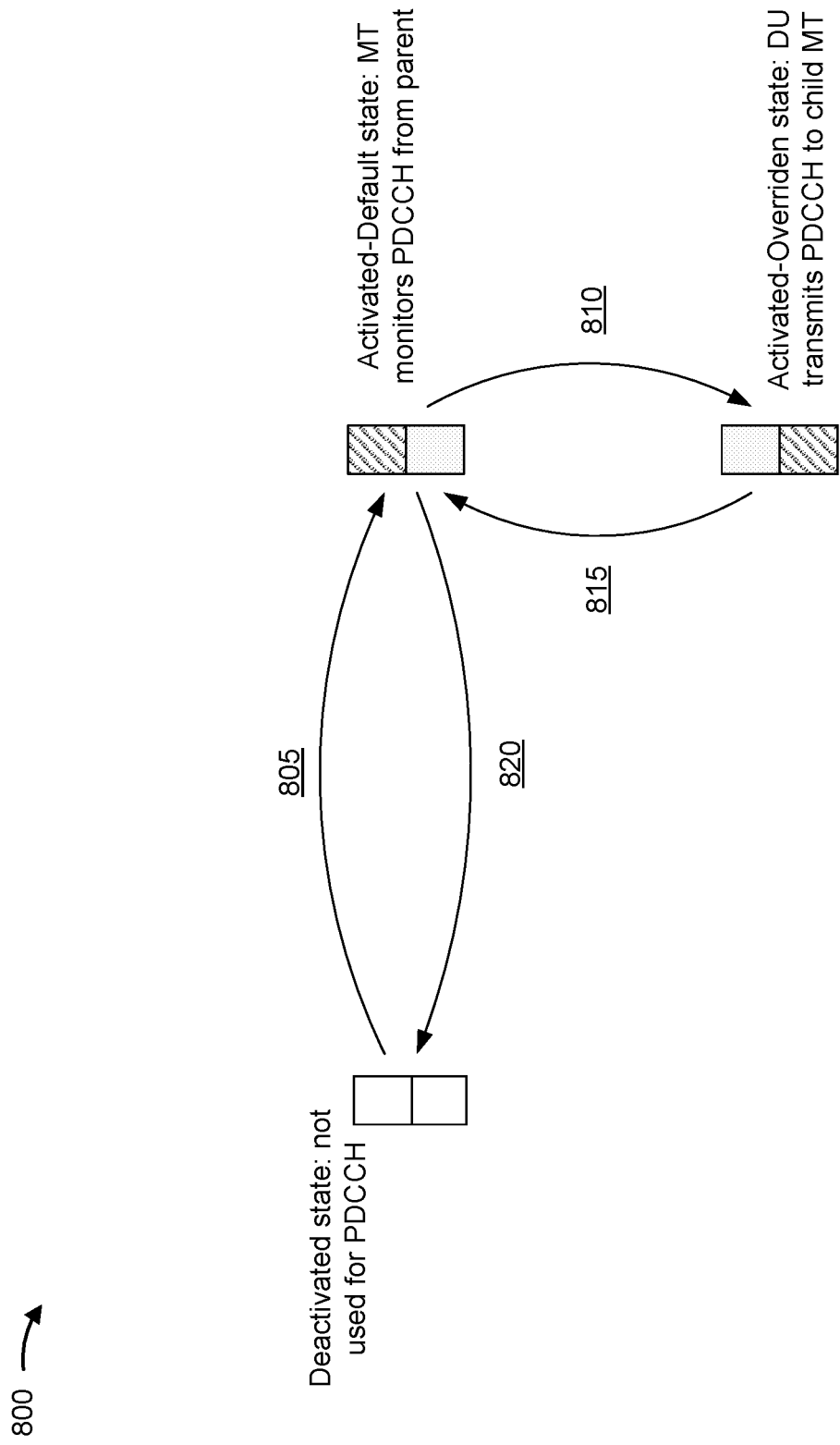

FIG. 8 is a diagram illustrating another example 800 of dynamic PDCCH resource sharing between PDCCH monitoring and PDCCH transmission, in accordance with various aspects of the present disclosure.

As indicated above in connection with FIG. 7, a node may reconfigure a Type 3 PDCCH resource from one state to another state, sometimes referred to as a state transition. For example, as shown in FIG. 8, the node may reconfigure a Type 3 PDCCH resource from a deactivated state to an activated default state and vice versa, and/or may reconfigure a Type 3 PDCCH resource from an activated default state to an activated overridden state and vice versa.

As described elsewhere herein, when a Type 3 PDCCH resource is in a deactivated state, then the Type 3 PDCCH resource is available for non-PDCCH communications (e.g., is used for neither PDCCH monitoring nor PDCCH transmission). When a Type 3 PDCCH resource is in a default activated state (shown as activated-default), then the Type 3 PDCCH resource is configured for PDCCH monitoring (and not PDCCH transmission). When a Type 3 PDCCH resource is in an overridden activated state (shown as activated-overridden), then the Type 3 PDCCH resource is configured for PDCCH transmission (and not PDCCH monitoring).

As shown by reference number 805, in some aspects, a node may reconfigure a Type 3 PDCCH resource from the deactivated state to the default activated state. For example, the node may receive an activation message from a parent node, which may trigger a state transition from the deactivated state to the default activated state. For example, a CU of an IAB donor 405 may receive URLLC data (e.g., a URLLC packet) and/or may receive an indication of upcoming URLLC data (e.g., a URLLC signaling message), which may trigger the CU to transmit an activation message to a first IAB node 410-1 that is a child node of the IAB donor 405. The first IAB node 410-1 may relay the activation message to one or more child nodes of the first IAB node 410-1, such as a second IAB node 410-2, and so on.

Additionally, or alternatively, the node may determine that an activation condition is satisfied, which may trigger a state transition from the deactivated state to the default activated state. In some aspects, the activation condition may be prespecified (e.g., in a wireless communication standard). In some aspects, the activation condition may be configured in a PDCCH resource configuration. In some aspects, the activation condition may be indicated in a deactivation message that triggers a state transition to the deactivated state. In some aspects, the activation condition may include receiving a URLLC grant. For example, if a node receives a URLLC grant in a Type 1 PDCCH resource, then the node may reconfigure one or more Type 3 PDCCH resources, subsequent to the Type 1 PDCCH resource (e.g., which may occur in the same slot as the Type 1 PDCCH resource), for PDCCH monitoring so that a URLLC communication can be received in a Type 3 PDCCH resource.

Additionally, or alternatively, the node may determine that one or more Type 3 PDCCH resources are to be activated for PDCCH monitoring to satisfy an objective stored in memory of the node, which may trigger a state transition from the deactivated state to the default activated state. For example, the objective may include balancing between achieving high resource utilization for a first traffic type (e.g., eMBB traffic) and achieving low latency for a second traffic type (e.g., URLLC traffic).

As shown by reference number 810, in some aspects, a node may reconfigure a Type 3 PDCCH resource from the default activated state to the overridden activated state. For example, the node may receive an override message from a parent node, which may trigger a state transition from the default activated state to the overridden activated state. For example, a parent node may transmit one or more URLLC packets followed by an override message to trigger a child node to relay the one or more URLLC packets.

Additionally, or alternatively, the node may determine that an override condition is satisfied, which may trigger a state transition from the default activated state to the overridden activated state. In some aspects, the override condition may be prespecified (e.g., in a wireless communication standard). In some aspects, the override condition may be configured in a PDCCH resource configuration. In some aspects, the override condition may be indicated in an activation message that triggers a state transition to the default activated state. In some aspects, the override condition may include receiving a URLLC communication, such as URLLC data, a DCI grant for URLLC data, a URLLC signaling message (e.g., URLLC control information, URLLC coordination information, an indication of a URLLC resource allocation, a URLLC grant, acknowledgement (ACK) and/or negative acknowledgement (NACK) (ACK/NACK) feedback for a URLLC communication, an uplink request for a URLLC packet from a child node, and/or the like), and/or the like. For example, if a child node receives URLLC data or a URLLC grant from a parent node, then the node may reconfigure one or more subsequent Type 3 PDCCH resources for PDCCH transmission so that the URLLC data can be transmitted to a child node (e.g., with low latency). For a soft resource of a DU, satisfaction of the condition may implicitly indicate that the soft resource is available.

Additionally, or alternatively, the node may determine that one or more Type 3 PDCCH resources are to be overridden (e.g., activated for PDCCH transmission) to satisfy an objective stored in memory of the node, which may trigger a state transition from the default activated state to the overridden activated state. For example, the objective may include achieving low latency for URLLC traffic.

As shown by reference number 815, in some aspects, a node may reconfigure a Type 3 PDCCH resource from the overridden activated state to the default activated state. For example, when the node completes a PDCCH transmission using one or more Type 3 PDCCH resources, the node may reconfigure subsequent Type 3 PDCCH resources for PDCCH monitoring (e.g., because the node does not have any more PDCCH communications to be transmitted).

As shown by reference number 820, in some aspects, a node may reconfigure a Type 3 PDCCH resource from the default activated state to the deactivated state. For example, the node may receive a deactivation message from a parent node, which may trigger a state transition from the default activated state to the deactivated state. For example, a CU of an IAB donor 405 may determine that transmission of URLLC data is complete (e.g., based at least in part on expiration of a URLLC timer that tracks an amount of time that has elapsed since a most recent reception of URLLC data), which may trigger the CU to transmit a deactivation message to a first IAB node 410-1 that is a child node of the IAB donor 405. The first IAB node 410-1 may relay the deactivation message to one or more child nodes of the first IAB node 410-1, such as a second IAB node 410-2, and so on.

Additionally, or alternatively, the node may determine that a deactivation condition is satisfied, which may trigger a state transition from the default activated state to the deactivated state. In some aspects, the deactivation condition may be prespecified (e.g., in a wireless communication standard). In some aspects, the deactivation condition may be configured in a PDCCH resource configuration. In some aspects, the deactivation condition may be indicated in an activation message that triggers a state transition to the default activated state.

In some aspects, the deactivation condition may include receiving URLLC data. For example, if a node receives a threshold number of URLLC packets (e.g., one or more URLLC packets) in the default activated state, then the node may deactivate the Type 3 PDCCH resource after transmission of the URLLC packets in the overridden activated state. In some aspects, the node may return to the default activated state from the overridden activated state before transitioning to the deactivated state, as shown in FIG. 8. Alternatively, the node may transition directly from the overridden activated state to the deactivated state. In some aspects, the node may start a timer upon receiving URLLC data (and/or may restart or reset the timer upon receiving additional URLLC data). Upon expiration of the timer, the node may transition to the deactivated state (e.g., from the default activated state).

Additionally, or alternatively, the node may determine that one or more Type 3 PDCCH resources are to be deactivated to satisfy an objective stored in memory of the node, which may trigger a state transition from the default activated state to the deactivated state. For example, the objective may include balancing between achieving high resource utilization for a first traffic type (e.g., eMBB traffic) and achieving low latency for a second traffic type (e.g., URLLC traffic).

By enabling flexible reconfiguration of PDCCH resources, a node may improve resource utilization and/or may satisfy communication requirements (e.g., for URLLC communications).

As indicated above, FIG. 8 is provided as an example. Other examples may differ from what is described with regard to FIG. 8.

Figure 9:
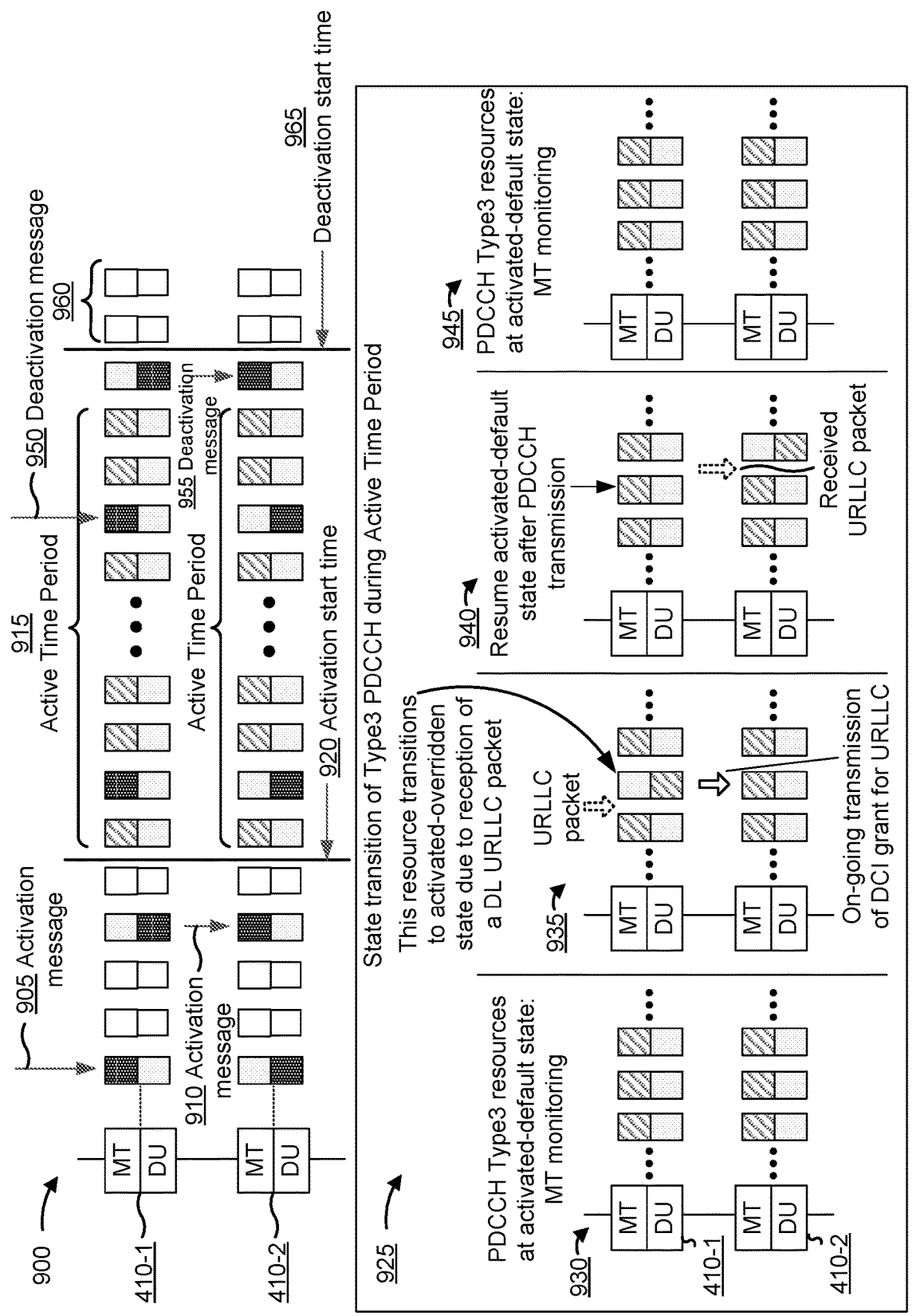

FIG. 9 is a diagram illustrating another example 900 of dynamic PDCCH resource sharing between PDCCH monitoring and PDCCH transmission, in accordance with various aspects of the present disclosure. In example 900, a first IAB node 410-1 and a second IAB node 410-2 have been configured with a PDCCH resource configuration for Type 1, Type 2, and Type 3 PDCCH resources, as described elsewhere herein. In example 900, the Type 3 PDCCH resources are initially configured in a deactivated state.

As shown by reference number 905, the first IAB node 410-1 may receive an activation message from a parent node of the first IAB node 410-1 (e.g., a parent IAB node 410 or an IAB donor 405). In some aspects, a CU of an IAB donor 405 may trigger the activation message based at least in part on receiving URLLC data or a URLLC signaling message (e.g., an indication from a node of upcoming URLLC data). Additionally, or alternatively, an IAB node 410 may trigger an activation message or a deactivation message (described below) to satisfy an objective stored in memory of the node, such as to balance between achieving high resource utilization for a first traffic type (e.g., eMBB traffic) and achieving low latency for a second traffic type (e.g., URLLC traffic).

As shown, the first IAB node 410-1 may receive the activation message in a Type 1 PDCCH resource dedicated to PDCCH monitoring. For example, the activation message may be included in downlink control information (DCI) carried via the PDCCH. For example, the activation message may be indicated using DCI have a specific format associated with the activation message. Additionally, or alternatively, the activation message may be indicated in DCI (e.g., a DCI grant) using a particular combination of DCI fields. In some aspects, the activation message may be included in a media access control (MAC) control element (CE) (MAC-CE). For example, the activation message may be carried in a downlink MAC-CE via the PDSCH.

As shown by reference number 910, the first IAB node 410-1 may transmit the activation message to the second IAB node 410-2. In some aspects, the first IAB node 410-1 may transmit the activation message using a Type 2 PDCCH resource, and the second IAB node 410-2 may receive the activation message using a Type 1 PDCCH resource (e.g., that is time-aligned with the Type 2 PDCCH resource), as shown.

As shown by reference number 915, based at least in part on receiving the activation message, the first IAB node 410-1 may activate one or more Type 3 PDCCH resources for PDCCH monitoring (e.g., in a default activated state). Similarly, the second IAB node 410-2 may activate one or more Type 3 PDCCH resources for PDCCH monitoring based at least in part on receiving the activation message.

As shown by reference number 920, in some aspects, the one or more Type 3 PDCCH resources may be activated for PDCCH monitoring based at least in part on an activation start time. For example, the first IAB node 410-1 may configure Type 3 PDCCH resources that occur after the activation start time in the default activated state. In some aspects, the activation start time for a node may depend on a hop count (e.g., a number of hops) between the node and a CU of an IAB donor 405.

In some aspects, the activation start time may be prespecified (e.g., according to a wireless communication standard). For example, the activation start time may occur a prespecified number of transmission time intervals (TTIs) (e.g., symbols, mini-slots, slots, and/or the like) after the activation message is received. In some aspects, the activation start time may be configured in a PDCCH resource configuration (e.g., a configured number of TTIs after the activation message is received). Additionally, or alternatively, the activation start time may be indicated in the activation message. For example, the activation message may include an indication of the activation start time, such as an indication of a number of TTIs after the activation message, an index value that maps to an activation start time of a set of activation start times that are prespecified or included in the PDCCH resource configuration, and/or the like.

Additionally, or alternatively, the activation message may indicate an active time period during which Type 3 PDCCH resources are to be activated for PDCCH monitoring. The time period may be indicated by, for example, some combination of a start time, an end time, and/or a duration for the active time period. Additionally, or alternatively, the activation message may indicate the Type 3 PDCCH resource(s) that are to be activated for PDCCH monitoring (e.g., all subsequent Type 3 PDCCH resources or a subset of subsequent Type 3 PDCCH resources). For example, the activation message may include TTI index values, a bitmap, an indication of a resource configuration pattern, and/or the like to identify the Type 3 PDCCH resources to be activated in the default activated state.

Additionally, or alternatively, the activation message may indicate a route (e.g., routing information) that identifies one or more child nodes to which the activation message is to be transmitted (e.g., one or more child nodes for which Type 3 PDCCH resources are to be activated). In some aspects, an IAB node 410 may receive an activation message, identify one or more child nodes to which the activation message is to be transmitted (e.g., using a route indicated in the activation message and/or in another message, such as a message associated with establishing a URLLC bearer), and may transmit the activation message to the one or more child nodes.

Additionally, or alternatively, the activation message may indicate a condition for deactivating Type 3 PDCCH resources after one or more Type 3 PDCCH resources are activated as a result of the activation message. For example, the activation message may indicate a deactivation start time at which the Type 3 PDCCH resources are to be deactivated. The deactivation start time may be indicated as, for example, a number of TTIs (e.g., symbols, mini-slots, slots, and/or the like), a threshold number of URLLC packets (e.g., where Type 3 PDCCH resources are to be deactivated after reception of the threshold number of URLLC packets), a deactivation timer (e.g., a duration of the deactivation timer), and/or the like, in a similar manner as described above in connection with FIG. 8.

As shown by reference number 925, during the active time period, the first IAB node 410-1 and the second IAB node 410-2 may reconfigure one or more Type 3 PDCCH resources as per the state transitions described above in connection with FIG. 8. For example, as shown by reference number 930, the first IAB node 410-1 and the second IAB node 410-2 may configure all Type 3 PDCCH resources in a default activated state for PDCCH monitoring based at least in part on receiving the activation message (or another trigger for activation). In some aspects, the nodes may monitor for URLLC data in the Type 3 PDCCH resources to reduce latency.

As shown by reference number 935, upon reception of a URLLC packet (e.g., URLLC data), the first IAB node 410-1 may reconfigure a subsequent Type 3 PDCCH resource (e.g., subsequent to reception of the URLLC packet) from a default activated state for PDCCH monitoring to an overridden activated state for PDCCH transmission. As shown, the first IAB node 410-1 may transmit, to the second IAB node 410-2 in the reconfigured Type 3 PDCCH resource, a DCI grant for the URLLC packet. The second IAB node 410-2 may receive the DCI grant in a Type 3 PDCCH resource configured in the default activated state.

As shown by reference number 940, after transmission of the DCI grant for the URLLC packet, the first IAB node 410-1 may reconfigure subsequent Type 3 PDCCH resources from the overridden activated state to the default activated state. The second IAB node 410-2 may receive, from the first IAB node 410-1, a URLLC packet scheduled by the DCI grant, and may reconfigure a subsequent Type 3 PDCCH resource (e.g., subsequent to reception of the URLLC packet) from a default activated state for PDCCH monitoring to an overridden activated state for PDCCH transmission of a DCI grant to a child node of the second IAB node 410-2.

As shown by reference number 945, after transmission of the DCI grant for the URLLC packet, the second IAB node 410-2 may reconfigure subsequent Type 3 PDCCH resources from the overridden activated state to the default activated state.

As shown by reference number 950, the first IAB node 410-1 may receive a deactivation message from a parent node of the first IAB node 410-1 (e.g., a parent IAB node 410 or an IAB donor 405). As shown, the first IAB node 410-1 may receive the deactivation message in a Type 1 PDCCH resource dedicated to PDCCH monitoring. For example, the deactivation message may be included in DCI carried via the PDCCH. For example, the deactivation message may be indicated using DCI have a specific format associated with the deactivation message. Additionally, or alternatively, the deactivation message may be indicated in DCI (e.g., a DCI grant) using a particular combination of DCI fields. In some aspects, the deactivation message may be included in a MAC-CE. For example, the deactivation message may be carried in a downlink MAC-CE via the PDSCH.

As shown by reference number 955, the first IAB node 410-1 may transmit the deactivation message to the second IAB node 410-2. In some aspects, the first IAB node 410-1 may transmit the deactivation message using a Type 2 PDCCH resource, and the second IAB node 410-2 may receive the deactivation message using a Type 1 PDCCH resource (e.g., that is time-aligned with the Type 2 PDCCH resource), as shown.

As shown by reference number 960, based at least in part on receiving the deactivation message, the first IAB node 410-1 may deactivate one or more Type 3 PDCCH resources (e.g., in a a deactivated state). Similarly, the second IAB node 410-2 may deactivate one or more Type 3 PDCCH resources based at least in part on receiving the deactivation message.

As shown by reference number 965, in some aspects, the one or more Type 3 PDCCH resources may be deactivated for PDCCH monitoring based at least in part on a deactivation start time. For example, the first IAB node 410-1 may configure Type 3 PDCCH resources that occur after the deactivation start time in the deactivated state. In some aspects, the deactivation start time for a node may depend on a hop count (e.g., a number of hops) between the node and a CU of an IAB donor 405.

In some aspects, the deactivation start time may be prespecified (e.g., according to a wireless communication standard). For example, the deactivation start time may occur a prespecified number of TTIs (e.g., symbols, mini-slots, slots, and/or the like) after the deactivation message or the activation message is received. In some aspects, the deactivation start time may be configured in a PDCCH resource configuration (e.g., a configured number of TTIs after the deactivation message or the activation message is received). Additionally, or alternatively, the deactivation start time may be indicated in the deactivation message and/or the activation message. For example, the deactivation message and/or the activation message may include an indication of the deactivation start time, such as an indication of a number of TTIs after the activation message and/or the deactivation message, an index value that maps to a deactivation start time of a set of deactivation start times that are prespecified or included in the PDCCH resource configuration, and/or the like.

Additionally, or alternatively, the deactivation message may indicate a time period during which Type 3 PDCCH resources are to be deactivated. The time period may be indicated by, for example, some combination of a start time, an end time, and/or a duration for the time period. Additionally, or alternatively, the deactivation message may indicate the Type 3 PDCCH resource(s) that are to be deactivated (e.g., all subsequent Type 3 PDCCH resources or a subset of subsequent Type 3 PDCCH resources). For example, the deactivation message may include TTI index values, a bitmap, an indication of a resource configuration pattern, and/or the like to identify the Type 3 PDCCH resources to be deactivated.

Additionally, or alternatively, the deactivation message may indicate a route (e.g., routing information) that identifies one or more child nodes to which the deactivation message is to be transmitted (e.g., one or more child nodes for which Type 3 PDCCH resources are to be deactivated). In some aspects, an IAB node 410 may receive a deactivation message, identify one or more child nodes to which the deactivation message is to be transmitted (e.g., using a route indicated in the deactivation message and/or in another message, such as a message associated with establishing a URLLC bearer), and may transmit the deactivation message to the one or more child nodes.

Additionally, or alternatively, the deactivation message may indicate a condition for activating Type 3 PDCCH resources after one or more Type 3 PDCCH resources are activated as a result of the activation message. For example, the deactivation message may indicate an activation start time at which the Type 3 PDCCH resources are to be activated. The activation start time may be indicated as, for example, a number of TTIs (e.g., symbols, mini-slots, slots, and/or the like), an activation timer (e.g., a duration of the deactivation timer), and/or the like, in a similar manner as described above in connection with FIG. 8.

As indicated above, FIG. 9 is provided as an example. Other examples may differ from what is described with regard to FIG. 9.

FIG. 10 is a diagram illustrating an example process 1000 performed, for example, by a node, in accordance with various aspects of the present disclosure. Example process 1000 is an example where a node (e.g., IAB donor 405, TAB node 410, and/or the like) performs operations associated with dynamic PDCCH resource sharing between PDCCH monitoring and PDCCH transmission.

As shown in FIG. 10, in some aspects, process 1000 may include receiving a configuration that indicates a first set of PDCCH resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node (block 1010). For example, the node (e.g., using receive processor 238, receive processor 258, controller/processor 240, controller/processor 280, memory 242, memory 282, and/or the like) may receive a configuration that indicates a first set of PDCCH resources dedicated to PDCCH monitoring by the node, a second set of PDCCH resources dedicated to PDCCH transmission by the node, and a third set of PDCCH resources permitted to be configured for either PDCCH monitoring by the node or PDCCH transmission by the node, as described above.

As further shown in FIG. 10, in some aspects, process 1000 may include configuring a resource of the third set of PDCCH resources for one of PDCCH monitoring, or neither PDCCH monitoring nor PDCCH transmission, based at least in part on an initial state associated with the resource (block 1020). For example, the node (e.g., using receive processor 238, receive processor 258, transmit processor 220, transmit processor 264, controller/processor 240, controller/processor 280, memory 242, memory 282, and/or the like) may configure a resource of the third set of PDCCH resources for one of PDCCH monitoring or neither PDCCH monitoring nor PDCCH transmission based at least in part on an initial state associated with the resource, as described above.

Process 1000 may include additional aspects, such as any single aspect or any combination of aspects described below and/or in connection with one or more other processes described elsewhere herein.

In a first aspect, the resource is configured for neither PDCCH monitoring nor PDCCH transmission based at least in part on a determination that the initial state is a deactivated state.

In a second aspect, alone or in combination with the first aspect, the resource is configured for PDCCH monitoring based at least in part on a determination that the initial state is a default activated state.

In a third aspect, alone or in combination with one or more of the first and second aspects, the initial state is either indicated in the configuration or is prespecified.

In a fourth aspect, alone or in combination with one or more of the first through third aspects, a same initial state is configured for all resources included in the third set of PDCCH resources.

In a fifth aspect, alone or in combination with one or more of the first through fourth aspects, different initial states are configured for different subsets of resources included in the third set of PDCCH resources.

In a sixth aspect, alone or in combination with one or more of the first through fifth aspects, the third set of PDCCH resources occurs more frequently than the first set of PDCCH resources and occurs more frequently than the second set of PDCCH resources.

In a seventh aspect, alone or in combination with one or more of the first through sixth aspects, the third set of PDCCH resources is used for mini-slot based scheduling.

In an eighth aspect, alone or in combination with one or more of the first through seventh aspects, process 1000 includes activating one or more resources, of the third set of PDCCH resources, for PDCCH monitoring based at least in part on at least one of: reception of an activation message from a parent node, a determination that an activation condition is satisfied, reception of an ultra-reliable low latency communication grant, a determination that the one or more resources are to be activated for PDCCH monitoring to satisfy an objective stored in memory of the node, or a combination thereof.

In a ninth aspect, alone or in combination with one or more of the first through eighth aspects, the activation condition is prespecified or indicated in a deactivation message that triggers the one or more resources to be configured for neither PDCCH monitoring nor PDCCH transmission.

In a tenth aspect, alone or in combination with one or more of the first through ninth aspects, the activation message is included in downlink control information or a media access control (MAC) control element (CE).

In an eleventh aspect, alone or in combination with one or more of the first through tenth aspects, the activation message indicates at least one of: a start time for activating the one or more resources for PDCCH monitoring, a time period during which the one or more resources are to be activated for PDCCH monitoring, the one or more resources that are to be activated for PDCCH monitoring, a condition for deactivation of resources after the one or more resources are activated for PDCCH monitoring, routing information that identifies one or more child nodes for which a set of resources are to be activated for PDCCH monitoring, or a combination thereof.

In a twelfth aspect, alone or in combination with one or more of the first through eleventh aspects, the one or more resources are activated for PDCCH monitoring based at least in part on a start time that is prespecified, configured, or indicated in the activation message.

In a thirteenth aspect, alone or in combination with one or more of the first through twelfth aspects, the objective is to balance between achieving high resource utilization for a first traffic type and achieving low latency for a second traffic type.

In a fourteenth aspect, alone or in combination with one or more of the first through thirteenth aspects, process 1000 includes deactivating one or more resources, of the third set of PDCCH resources, based at least in part on at least one of: reception of a deactivation message from a parent node, a determination that a deactivation condition is satisfied, reception of ultra-reliable low latency communication data, a determination that the one or more resources are to be deactivated to satisfy an objective stored in memory of the node, or a combination thereof.

In a fifteenth aspect, alone or in combination with one or more of the first through fourteenth aspects, the deactivation condition is prespecified or indicated in an activation message that triggers the one or more resources to be configured for PDCCH monitoring.

In a sixteenth aspect, alone or in combination with one or more of the first through fifteenth aspects, the deactivation message is included in downlink control information or a MAC CE.

In a seventeenth aspect, alone or in combination with one or more of the first through sixteenth aspects, the deactivation message indicates at least one of: a start time for deactivating the one or more resources, a time period during which the one or more resources are to be deactivated, the one or more resources that are to be deactivated, a condition for activation of resources for PDCCH monitoring after the one or more resources are deactivated, routing information that identifies one or more child nodes for which a set of resources are to be deactivated, or a combination thereof.

In an eighteenth aspect, alone or in combination with one or more of the first through seventeenth aspects, the one or more resources are deactivated for neither PDCCH monitoring nor PDCCH transmission based at least in part on a start time that is prespecified, configured, indicated in the deactivation message, or indicated in an activation message.

In a nineteenth aspect, alone or in combination with one or more of the first through eighteenth aspects, the objective is to balance between achieving high resource utilization for a first traffic type and achieving low latency for a second traffic type.

In a twentieth aspect, alone or in combination with one or more of the first through nineteenth aspects, process 1000 includes activating one or more resources, of the third set of PDCCH resources, for PDCCH transmission based at least in part on at least one of: reception of an override message from a parent node, a determination that an override condition is satisfied, reception of ultra-reliable low latency communication (URLLC) data or a URLLC signaling message, a determination that the one or more resources are to be activated for PDCCH transmission to satisfy an objective stored in memory of the node, or a combination thereof.

In a twenty-first aspect, alone or in combination with one or more of the first through twentieth aspects, the objective is to achieve low latency for ultra-reliable low latency communications across the multi-hop network.

In a twenty-second aspect, alone or in combination with one or more of the first through twenty-first aspects, the configuration or an activation message is received based at least in part on transmission of URLLC data or a URLLC signaling message to a central unit.

In a twenty-third aspect, alone or in combination with one or more of the first through twenty-second aspects, process 1000 includes transmitting, to a child node, an activation message to trigger activation of a set of resources of the child node for PDCCH monitoring or a deactivation message to trigger deactivation of a set of resources of the child node for neither PDCCH monitoring nor PDCCH transmission to satisfy an objective stored in memory of the node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a triggering node, in accordance with various aspects of the present disclosure. Example process 1100 is an example where a triggering node (e.g., IAB donor 405, TAB node 410, and/or the like) performs operations associated with dynamic PDCCH resource sharing between PDCCH monitoring and PDCCH transmission.

As shown in FIG. 11, in some aspects, process 1100 may include transmitting a configuration that indicates a first set of physical downlink control channel (PDCCH) resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node (block 1110). For example, the triggering node (e.g., using transmit processor 220, transmit processor 264, controller/processor 240, controller/processor 280, memory 242, memory 282, and/or the like) may transmit a configuration that indicates a first set of PDCCH resources to be dedicated to PDCCH monitoring by a node in the multi-hop network, a second set of PDCCH resources to be dedicated to PDCCH transmission by the node, and a third set of PDCCH resources permitted to be configured for either PDCCH monitoring by the node or PDCCH transmission by the node, as described above.

As further shown in FIG. 11, in some aspects, process 1100 may include transmitting an activation message to activate one or more resources of the third set of PDCCH resources for PDCCH monitoring (block 1120). For example, the triggering node (e.g., using transmit processor 220, transmit processor 264, controller/processor 240, controller/processor 280, memory 242, memory 282, and/or the like) may transmit an activation message to activate one or more resources of the third set of PDCCH resources for PDCCH monitoring, as described above.

Process 1100 may include additional aspects, such as any single aspect or any combination of aspects described below and/or in connection with one or more other processes described elsewhere herein.

In a first aspect, the activation message is transmitted based at least in part on reception of URLLC data or a URLLC signaling message.

In a second aspect, alone or in combination with the first aspect, an initial state for a resource, of the third set of PDCCH resources, is indicated in the configuration.

In a third aspect, alone or in combination with one or more of the first and second aspects, the initial state is one of an activated state for PDCCH monitoring or a deactivated state for neither PDCCH monitoring nor PDCCH transmission.

In a fourth aspect, alone or in combination with one or more of the first through third aspects, the third set of PDCCH resources occurs more frequently than the first set of PDCCH resources and occurs more frequently than the second set of PDCCH resources.

In a fifth aspect, alone or in combination with one or more of the first through fourth aspects, the third set of PDCCH resources is used for mini-slot based scheduling.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node in a multi-hop network, comprising:
   receiving a configuration that indicates a first set of physical downlink control channel (PDCCH) resources dedicated to PDCCH monitoring by the node, a second set of PDCCH resources dedicated to PDCCH transmission by the node, and a third set of PDCCH resources permitted to be configured for PDCCH monitoring by the node when a resource of the third set of PDCCH resources is in a first state and for neither PDCCH monitoring nor PDCCH transmission when the resource of the third set of PDCCH resources is in a second state; and
   configuring the resource of the third set of PDCCH resources for one of PDCCH monitoring or neither PDCCH monitoring nor PDCCH transmission based at least in part on the resource being in an initial state that is one of the first state or the second state.

2. The method of claim 1, wherein the resource is configured for neither PDCCH monitoring nor PDCCH transmission based at least in part on a determination that the initial state is the second state, and wherein the second state is a deactivated state.

3. The method of claim 1, wherein the resource is configured for PDCCH monitoring based at least in part on a determination that the initial state is the first state, and wherein the first state is a default activated state.

4. The method of claim 1, wherein the initial state is either indicated in the configuration or is prespecified.

5. The method of claim 1, wherein a same initial state is configured for all resources included in the third set of PDCCH resources.

6. The method of claim 1, wherein different initial states are configured for different subsets of resources included in the third set of PDCCH resources.

7. The method of claim 1, wherein the third set of PDCCH resources occurs more frequently than the first set of PDCCH resources and occurs more frequently than the second set of PDCCH resources.

8. The method of claim 1, wherein the third set of PDCCH resources is used for mini-slot based scheduling.

9. The method of claim 1, further comprising activating one or more resources, of the third set of PDCCH resources and including the resource, for PDCCH monitoring based at least in part on at least one of:
   reception of an activation message from a parent node,
   a determination that an activation condition is satisfied,
   reception of an ultra-reliable low latency communication grant,
   a determination that the one or more resources are to be activated for PDCCH monitoring to satisfy an objective stored in memory of the node, or
   a combination thereof.

10. The method of claim 9, wherein the activation condition is prespecified or indicated in a deactivation message that triggers the one or more resources to be configured for neither PDCCH monitoring nor PDCCH transmission.

11. The method of claim 9, wherein the activation message is included in downlink control information or a media access control (MAC) control element (CE).

12. The method of claim 9, wherein the activation message indicates at least one of:

a start time for activating the one or more resources for PDCCH monitoring,
a time period during which the one or more resources are to be activated for PDCCH monitoring,
the one or more resources that are to be activated for PDCCH monitoring,
a condition for deactivation of resources after the one or more resources are activated for PDCCH monitoring,
routing information that identifies one or more child nodes for which a set of resources are to be activated for PDCCH monitoring, or
a combination thereof.

13. The method of claim 9, wherein the one or more resources are activated for PDCCH monitoring based at least in part on a start time that is prespecified, configured, or indicated in the activation message.

14. The method of claim 9, wherein the objective is to balance between achieving high resource utilization for a first traffic type and achieving low latency for a second traffic type.

15. The method of claim 1, further comprising deactivating one or more resources, of the third set of PDCCH resources, based at least in part on at least one of:
reception of a deactivation message from a parent node,
a determination that a deactivation condition is satisfied,
reception of ultra-reliable low latency communication data,
a determination that the one or more resources are to be deactivated to satisfy an objective stored in memory of the node, or
a combination thereof.

16. The method of claim 15, wherein the deactivation condition is prespecified or indicated in an activation message that triggers the one or more resources to be configured for PDCCH monitoring.

17. The method of claim 15, wherein the deactivation message is included in downlink control information or a media access control (MAC) control element (CE).

18. The method of claim 15, wherein the deactivation message indicates at least one of:
a start time for deactivating the one or more resources,
a time period during which the one or more resources are to be deactivated,
the one or more resources that are to be deactivated,
a condition for activation of resources for PDCCH monitoring after the one or more resources are deactivated,
routing information that identifies one or more child nodes for which a set of resources are to be deactivated, or
a combination thereof.

19. The method of claim 15, wherein the one or more resources are deactivated for neither PDCCH monitoring nor PDCCH transmission based at least in part on a start time that is prespecified, configured, indicated in the deactivation message, or indicated in an activation message.

20. The method of claim 1, further comprising activating one or more resources, of the third set of PDCCH resources, for PDCCH transmission based at least in part on at least one of:
reception of an override message from a parent node,
a determination that an override condition is satisfied,
reception of ultra-reliable low latency communication (URLLC) data or a URLLC signaling message,
a determination that the one or more resources are to be activated for PDCCH transmission to satisfy an objective stored in memory of the node, or
a combination thereof.

21. The method of claim 1, wherein the configuration or an activation message is received based at least in part on transmission of ultra-reliable low latency communication (URLLC) data or a URLLC signaling message to a central unit.

22. The method of claim 1, further comprising transmitting, to a child node, an activation message to trigger activation of a set of resources of the child node for PDCCH monitoring or a deactivation message to trigger deactivation of a set of resources of the child node for neither PDCCH monitoring nor PDCCH transmission to satisfy an objective stored in memory of the node.

23. A method of wireless communication performed by a triggering node in a multi-hop network, comprising:
transmitting a configuration that indicates a first set of physical downlink control channel (PDCCH) resources to be dedicated to PDCCH monitoring by a node in the multi-hop network, a second set of PDCCH resources to be dedicated to PDCCH transmission by the node, and a third set of PDCCH resources permitted to be configured for PDCCH monitoring by the node when a resource of the third set of PDCCH resource is in a first state and neither PDCCH monitoring nor PDCCH transmission when the resource of the third set of PDCCH resources is in a second state; and
transmitting an activation message to activate one or more resources, of the third set of PDCCH resources and including the resource, for PDCCH monitoring.

24. The method of claim 23, wherein the activation message is transmitted based at least in part on reception of ultra-reliable low latency communication (URLLC) data or a URLLC signaling message.

25. The method of claim 23, wherein an initial state for a resource, of the third set of PDCCH resources, is indicated in the configuration, and wherein the initial state is one of the first state or the second state.

26. The method of claim 25, wherein the first state is an activated state for PDCCH monitoring, and wherein the second state is a deactivated state for neither PDCCH monitoring nor PDCCH transmission.

27. The method of claim 23, wherein the third set of PDCCH resources occurs more frequently than the first set of PDCCH resources and occurs more frequently than the second set of PDCCH resources.

28. The method of claim 23, wherein the third set of PDCCH resources is used for mini-slot based scheduling.

29. A node in a multi-hop network for wireless communication, comprising:
a memory; and
one or more processors coupled to the memory the one or more processors configured to:
receive a configuration that indicates a first set of physical downlink control channel (PDCCH) resources dedicated to PDCCH monitoring by the node, a second set of PDCCH resources dedicated to PDCCH transmission by the node, and a third set of PDCCH resources permitted to be configured for PDCCH monitoring by the node when a resource of the third set of PDCCH resources is in a first state and for neither PDCCH monitoring nor PDCCH transmission when the resource of the third set of PDCCH resources is in a second state; and
configure the resource of the third set of PDCCH resources for one of PDCCH monitoring or neither PDCCH monitoring nor PDCCH transmission based at least in part on the resource being in an initial state that is one of the first state or the second state.

30. A triggering node in a multi-hop network for wireless communication, comprising:
a memory; and
one or more processors coupled to the memory, the one or more processors configured to:
transmit a configuration that indicates a first set of physical downlink control channel (PDCCH) resources to be dedicated to PDCCH monitoring by a node in the multi-hop network, a second set of PDCCH resources to be dedicated to PDCCH transmission by the node, and a third set of PDCCH resources permitted to be configured for PDCCH monitoring by the node when a resource of the third set of PDCCH resources is in a first state and for neither PDCCH monitoring nor PDCCH transmission when the resource of the third set of PDCCH resources is in a second state; and
transmit an activation message to activate one or more resources, of the third set of PDCCH resources and including the resource, for PDCCH monitoring.

* * * * *